(12) United States Patent
Sun et al.

(10) Patent No.: US 6,947,023 B2
(45) Date of Patent: Sep. 20, 2005

(54) HOUSING FOR PROTECTING FLAT PANEL DISPLAY AND METHOD FOR ASSEMBLING FLAT PANEL DISPLAY AND THE HOUSING

(75) Inventors: Kai-Yu Sun, Hsinchu Hsien (TW); Chin-Kun Hsieh, Taichung (TW)

(73) Assignee: AU Optronics Corp., Hsinchu Hsien (TW)

( * ) Notice: Subject to any disclaimer, the term of this patent is extended or adjusted under 35 U.S.C. 154(b) by 433 days.

(21) Appl. No.: 09/970,644

(22) Filed: Oct. 5, 2001

(65) Prior Publication Data

US 2002/0041482 A1 Apr. 11, 2002

(30) Foreign Application Priority Data

Oct. 9, 2000 (TW) ........................ 89121134 A

(51) Int. Cl.[7] .................................................. G09G 3/36
(52) U.S. Cl. .......................................... 345/102; 345/98
(58) Field of Search ................................ 345/87, 90, 93, 345/98, 102, 96; 361/681

(56) References Cited

U.S. PATENT DOCUMENTS 6,048,487 A * 4/2000 Almquist et al. ............ 264/401
6,577,288 B1 * 6/2003 Min ............................. 345/87

FOREIGN PATENT DOCUMENTS

| JP | 132281 | 9/1984 |
| JP | 6-69953 | 9/1994 |
| JP | 223517 | 8/1996 |
| JP | 9-104294 | 4/1997 |
| JP | 242189 | 8/2000 |
| JP | 2000-305477 | 11/2000 |
| JP | 2001-222238 | 8/2001 |
| TW | 406839 | 1/1999 |

* cited by examiner

*Primary Examiner*—Vijay Shankar
(74) *Attorney, Agent, or Firm*—Bacon & Thomas, PLLC

(57) ABSTRACT

A housing for protecting a flat panel display includes a rear blade, a front blade, and a side blade. the side blade is integrated with and sandwiched between the front blade and the rear blade to form a linear frame having a cross-section in a shape of a "⊓", and the linear frame is allowed to fold to surround the partial or the whole edge of the flat panel display.

8 Claims, 3 Drawing Sheets

HOUSING FOR PROTECTING FLAT PANEL DISPLAY AND METHOD FOR ASSEMBLING FLAT PANEL DISPLAY AND THE HOUSING

BACKGROUND OF THE INVENTION

1. Field of the Invention

The present invention relates to a housing for a display and, more particularly, to a housing for a flat panel display.

2. Description of Related Art

Currently, flat panel displays are combined with many plastic or metallic frames outside the panel for protecting the panel from impact or for blocking light. For example, the liquid crystal display, as shown in FIG. 1, is often manufactured by assembling a backlight module 41 with a housing 44, a bottom frame 43, a liquid crystal display panel module 40, and a top frame 42 (i.e. a front bezel) together. However, this kind of assembly needs to waste a lot of time and material for manufacturing the molds of housing and frames. This assembly increases the costs for manufacturing the flat panel display and takes a lot of time for the coordination of mold manufacturers and panel assemblers. In addition, conventional display panels and frames are not convenient to assemble or to disassemble. Moreover, the weight of the many frames also increases the total weight of the whole flat panel display.

Therefore, it is desirable to provide an improved assembly of the conventional flat panel display and a method for assembling a flat panel display and the protecting housing and frame to mitigate and obviate the aforementioned problems.

SUMMARY OF THE INVENTION

The object of the present invention is to provide a housing for protecting a flat panel display to fix the location of the display panel and the backlight module and reduce the number of moldings or save time and cost required for making said housing.

Another object of the present invention is to provide a light housing to reduce the total weight of the combined assembly of said housing and the display panel and the backlight module, and to easily assemble or dissemble the combined assembly of said housing and the display panel and the backlight module.

Another object of the present invention is to provide a flat panel display with low weight, low cost and simple assembly of the housing.

Another object of the present invention is to provide a simple method to assemble the display panel and the backlight module and the housing, and further to reduce the weight of the combined assembly of the display panel and the backlight module and the housing.

To achieve the object, the housing for protecting a flat panel display of the present invention comprises: a rear blade, a front blade, and a side blade perpendicular to and connecting said rear and front blades, wherein said side blade is integrated with and sandwiched between said front blade and said rear blade to form a linear frame having a cross-section in a shape of " ", and said frame is allowed to fold to surround the partial or the whole edge of said flat panel display.

The flat panel display of the present invention comprises: a display panel and/or backlight module, and a housing comprising: a rear blade, a front blade, and a side blade perpendicular to and connecting the front and rear blades, wherein said side blade is integrated with and sandwiched by said front blade and said rear blade to form a linear frame having a cross-section in a shape of " ", and said linear frame is allowed to fold to surround the partial or whole edge of said flat panel display.

The method for assembling a flat panel display comprises the following steps: (A) providing a flat panel display, and a housing for protecting the flat panel display, comprising: a rear blade, a front blade, and a side blade wherein said side blade is integrated with and sandwiched by said front blades and said rear blades to form a linear frame; and (B) folding or bending said linear frame to surround at least part of the edge of said flat panel.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
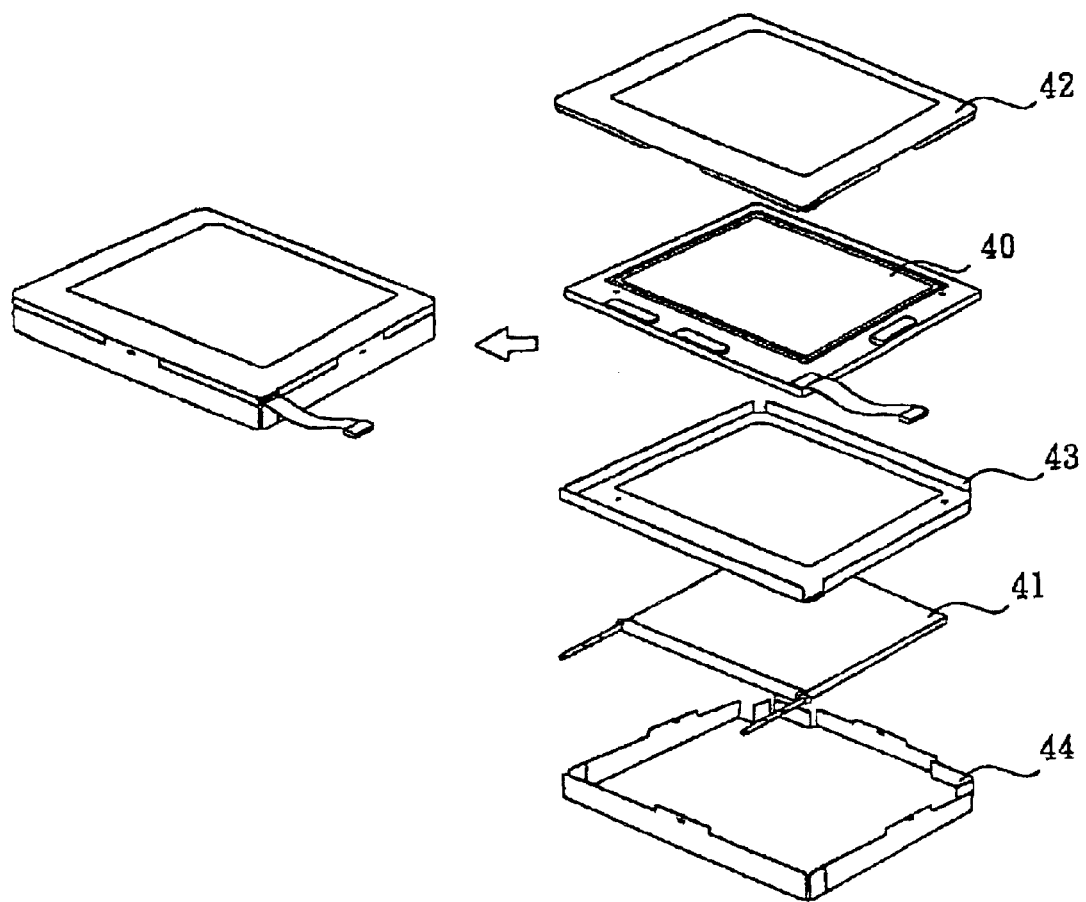
FIG. 1 is a perspective view of the conventional assembly of housing and the liquid crystal display.

The housing for protecting a flat panel display of the present invention comprises: a rear blade, a front blade, and a side blade wherein said side blade is integrated with and sandwiched between said front blade and said rear blade to form a linear frame having a cross-section in a shape of " ", and said linear frame is allowed to fold to surround the partial or the whole edge of said flat panel display.

The housing of the present invention for protecting a flat panel display can be used for protecting display panels or a display panel with integrated IC chips and PCB boards. The backlight module in the present invention includes a integrated combination of light guides, light sources (e.g. LED or CCFL), diffuser sheets and other optical films. The flat panel display of the present invention is not limited. Preferably, the flat panel display panel is a liquid crystal display panel or organic light emission display panel. The size of the flat panel display of the present invention is not limited, either. The method for manufacturing the housing of the present invention is not limited. Preferably, the housing of the present invention is made by injection molding or extrusion molding. The inner surface of the linear frame of the present invention can be attached with any functional parts for additional function. Preferably, a plurality of separate blades can be attached on the surface of the inner surface of the linear frame. Most preferably, the separate blades are parallel to the face blades of the frame of the present invention. The number of the separate blades is not limited. The number of layers of the separate blades is not limited, either. Preferably, the number of layer of the separate blades is one. The length of the linear frame of the present invention is not limited. The length of the linear frame of the present invention can be adjusted to meet the size of the display panel. Preferably, the length is equal to or greater than the perimeter of the display panel. The linear frame of the present invention can be selectively arranged additional parts for additional function. Preferably, at least a binding unit is mounted or arranged on the surface of the side blade. The binding unit on the linear frame of the present invention is not limited. Any conventional binding unit can be applied or arranged on the linear frame of the present invention. Preferably, the binding unit includes fasteners such as clips, hooks, a male/female locking unit, screws, bolts, a combination of a tenon and a groove, or glue. Conventional adhesives or tape with adhesives can be selectively added to the binding unit to help the binding unit to better bind the ends of the frame to keep the folded linear frame closed. The location of the binding unit on the linear frame is not limited. Preferably, the binding unit is arranged at the ends of the linear frame. The location of the cuts on the surface of the face blades of the linear frame is not limited. Preferably, the cuts locate at the bending or folding position of the linear frame to meet the corner of panel. The shape of the cuts on the linear frame is not limited. Preferably, the cuts on the linear frame are V-cuts. The number of the cuts is not limited. Preferably, 3 or more cuts are arranged on the linear frame of the present invention. At least an opening for electric cable can be selectively arranged on the linear frame of the present invention. Preferably, one opening is arranged on the linear frame of the present invention to extend a cable for power or transmission of signals. The material of the linear frame of the present invention is not limited. Preferably, the linear frame of the present invention is made by dark plastic or metal. The inner edge of the linear frame of the present invention will define a central open window that forms the active area for display of images after the linear frame is folded and closed.

Figure 2:
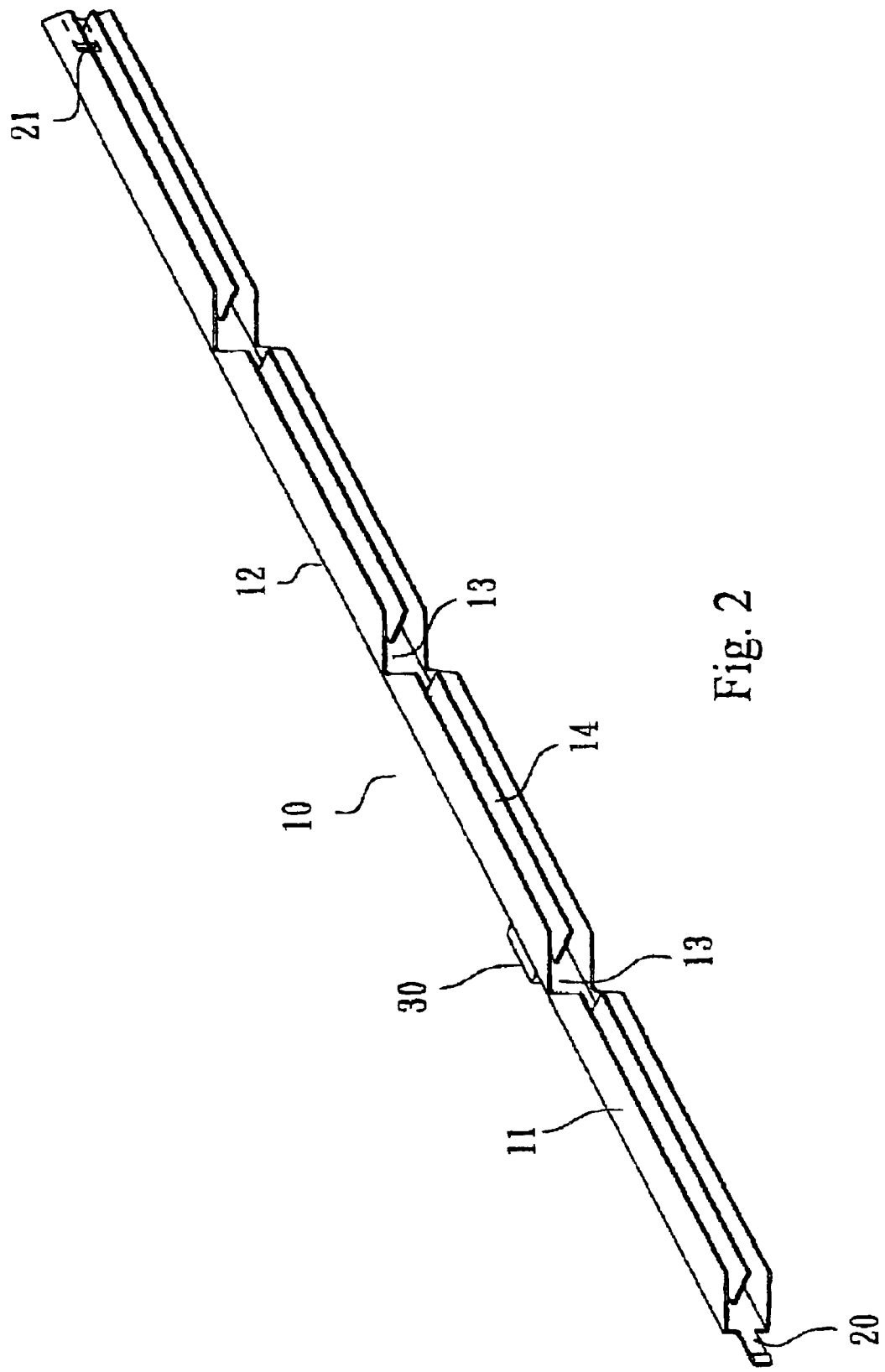
FIG. 2 is a perspective view of the linear frame of the present invention.
Figure 3:
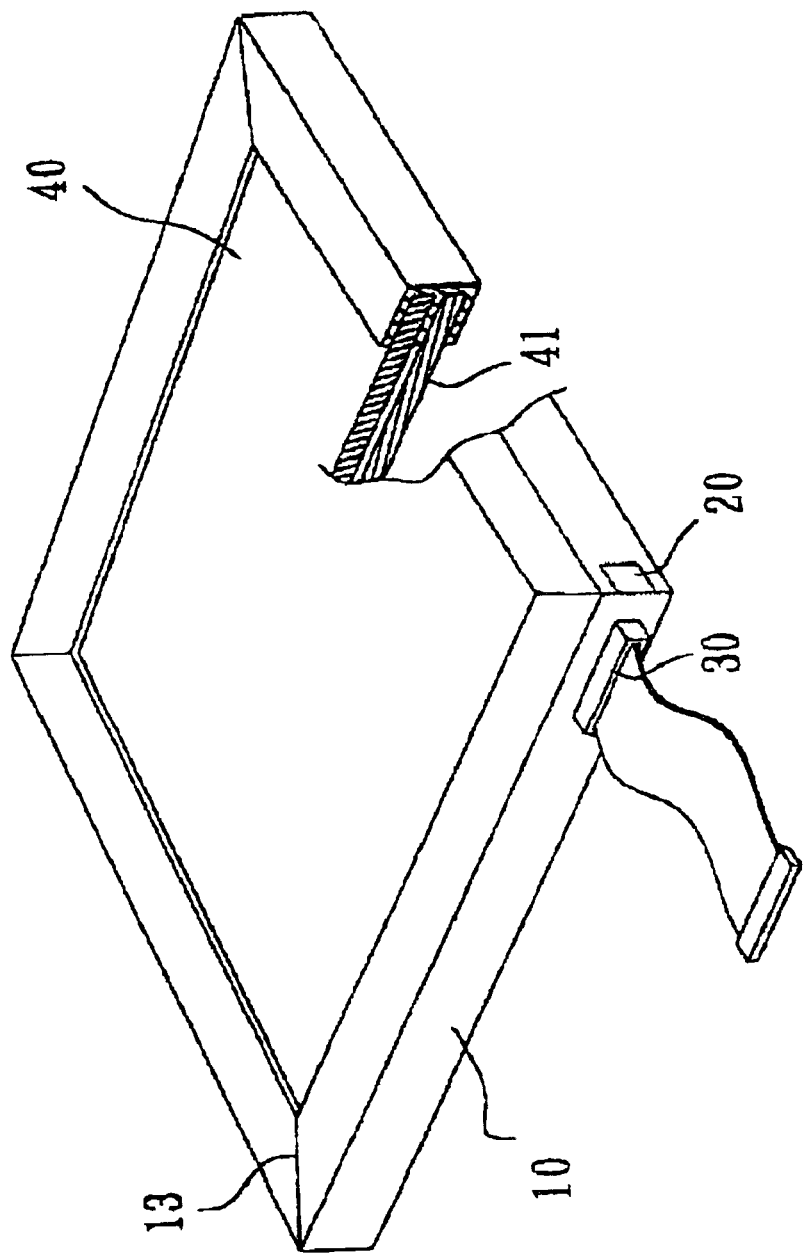
FIG. 3 is a perspective view of assembly of the liquid crystal display panel, the backlight module and the folded linear frame of the present invention.

With reference to FIG. 2 and FIG. 3, there is shown a housing for a flat panel display of the present invention. The housing shown in FIG. 2 is used to surround a liquid crystal display panel 40 and a backlight module 41. The housing is formed by folding a linear frame 10 having a cross-section in a shape of " ". The foldable linear frame 10 includes a pair of linear face blades 11 and a linear side blade 12 which is perpendicular to and sandwiched between the two face blades 11 (the front blade and the rear blade) to form the " " shape. Furthermore, the surface of side blade 12 is perpendicular to the surfaces of the face blades 11. The two ends of the linear frame 10 are connected through a binding unit after folding to form a closed housing for surrounding at least the edges of the liquid crystal display panel 40 and the backlight module 41. In the present example, the binding unit on the linear frame 10 is a combination of hook 20 and a groove 21. The inner edge of the closed linear frame 10 defines a central open window that forms an active area for the liquid crystal display panel 40 to display words and images. On the inner surface of said side blade 12, several separate blades 14 locate to fix the position and limit the movement of the liquid crystal display panel 40 and the backlight module 41. In the present invention, the separate blades 14 are parallel to the face blades 11. Moreover, on the surface of the face blades 11, a plurality of V-cuts 13 is formed. In the present example, three V-cuts can be found on the face blades 11. The V-cuts 13 on the face blades 11 (either front blade or rear blade) of the linear frame 10 preferably locate the position for future folding to ease the folding of the linear frame 10. Most of the time, said linear frame 10 of the present invention is made of materials that can block the light In the example, the linear frame 10 is made of a dark plastic. In addition, an opening 30 is arranged on the surface of the side blade 12. The opening 30 on the side blade 12 of the linear frame 10 can ease the arrangement of a electric cable (for example, an FPC (Flexible Printed Circuit)) for connecting the outside processor and said liquid crystal display panel 40 and said backlight module 41 inside said housing as the linear frame 10 is folded to be closed (referring to FIG. 3). When the housing is applied, one side edge of the liquid crystal panel and the backlight module are placed in the ditch or groove of the linear frame 10, then the linear frame 10 is folded to surround the whole peripheral edge of the liquid crystal display panel and the backlight module. The inner edge of the closed linear frame 10 defines a central open window to form an active area of the liquid crystal display panel to display images.

By using the housing of the present invention, only one housing is required. Furthermore, only one mold for making the housing for the flat panel display is needed. Compared with the conventional housing assembly for protecting the flat panel display (e.g. liquid crystal display panel), less parts is required. In addition, compared with the conventional method for making the housing assembly, less molds must be made. And, of course, less time and less cost for making molding is taken. The housing of the present invention is easy to make and assemble. On the other hand, since only one part (i.e. the linear frame of the present invention) is needed in the housing of the present invention, the assembling and taking-out of the flat panel display and the housing can be achieved very easily and quickly. In addition, since only one part is required, the housing of the present invention is also comparably light. Therefore, compared with conventional flat panel display, the weight of the flat panel display integrated with the housing of the present invention is light. The housing of the present invention can be produced through any kind of conventional methods. Preferably, the housing of the present invention is made by injection molding. By using the housing of the present invention, the assembly of the flat panel display can be simplified, and the cost and the time for manufacturing the molds for the housing can be well saved. Therefore, the housing and the method for assembling the housing of the present invention is novel, simple and non-obvious.

Although the present invention has been explained in relation to its preferred embodiment, it is to be understood that many other possible modifications and variations can be made without departing from the spirit and scope of the invention as hereinafter claimed.

What is claimed is:

1. A housing for protecting a flat panel display, comprising:
    a rear blade;
    a front blade; and
    a side blade extending between and integrated with the front blade and the rear blade,
    wherein the side blade is transformable from a linear shape to a bent shape, the side blade extends substantially along a straight line when the side blade is in the linear shape, and the side blade is bent to form at least one angle when the side blade is in the bent shape;
    whereby when the housing is used to protect the flat panel display, the side blade is in the bent shape and substantially extends along and covers at least two adjacent lateral edges of the flat panel display, the front blade is disposed in front of the flat panel display, and the rear blade is disposed behind the flat panel display.

2. The housing as claimed in claim 1, wherein the side blade comprises a pair of locking mechanisms formed on the opposite ends of the side blade, and the pair of locking mechanisms engages with each other when the side blade is in the bent shape.

3. The housing as claimed in claim 1, wherein the rear blade comprises a cut.

4. The housing as claimed in claim 3, wherein the cut is V shaped, and the rear blade forms a continuous coverage on a rear surface of the flat panel display when the side blade is in the bent shape.

5. The housing as claimed in claim 1, wherein the front blade comprises a cut.

6. The housing as claimed in claim 5, wherein the cut is V shaped, and the front blade forms a continuous coverage on a front surface of the flat panel display when the side blade is in the bent shape.

7. The housing as claimed in claim 1, further comprises at least one separate inner blade protruded from the side blade and extended between the front blade and the rear blade;

a first space formed between the inner blade and the front blade for receiving a display panel; and a second space formed between the inner blade and the rear blade for receiving a backlight module.

8. The housing as claimed in claim 1, wherein the side blade comprises at least one opening for an electric cable.

* * * * *